Feb. 10, 1970     J. C. DUDDY     3,494,797
METHOD FOR OPERATING A FUEL CELL
Filed March 22, 1965
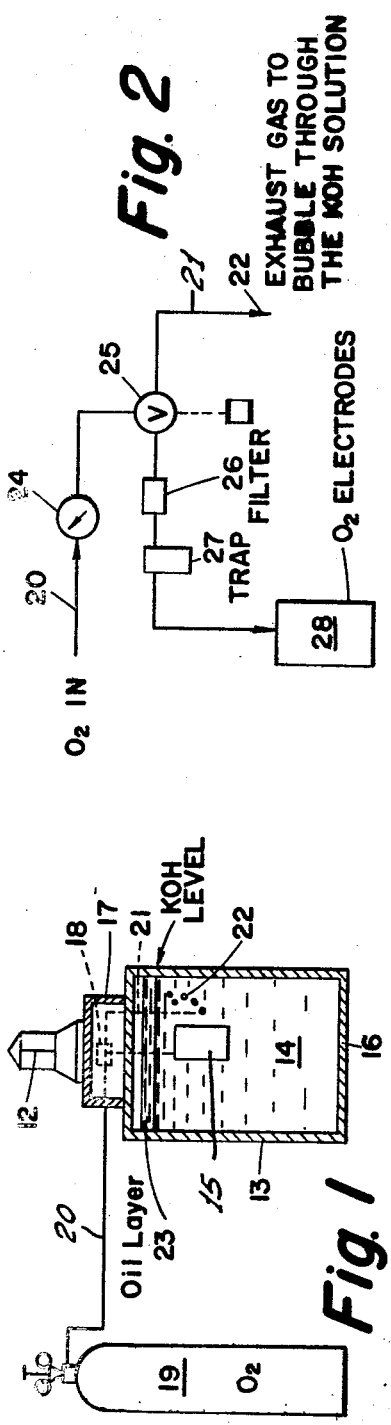
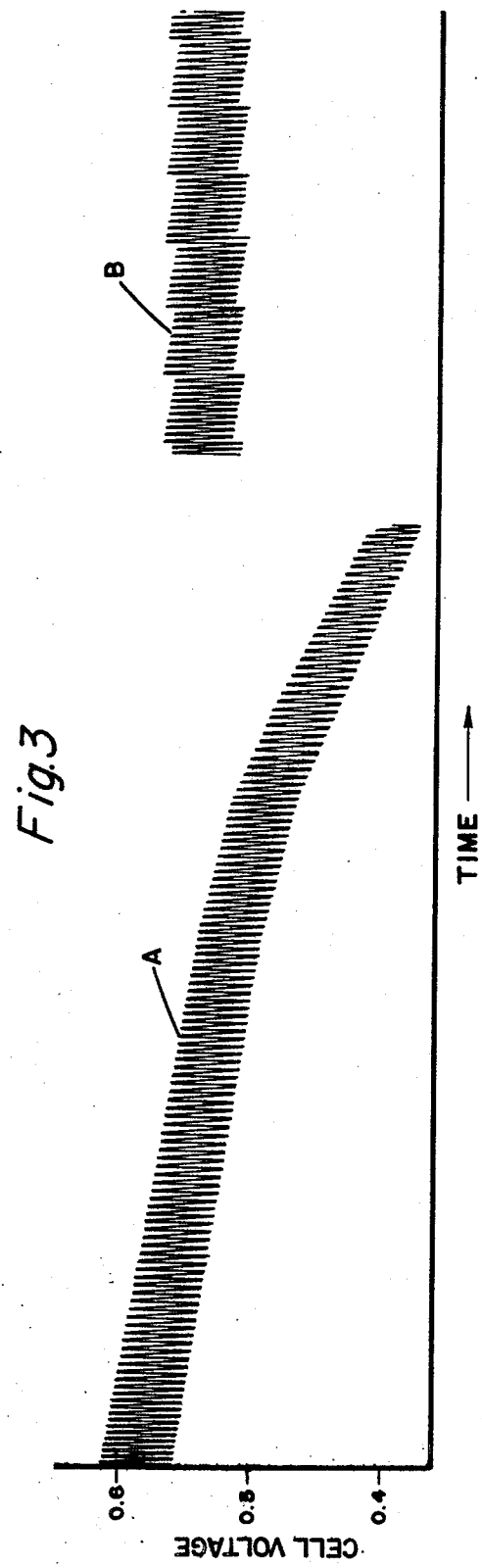

United States Patent Office 3,494,797
Patented Feb. 10, 1970

3,494,797
METHOD FOR OPERATING A FUEL CELL
Joseph C. Duddy, Trevose, Pa., assignor to ESB Incorporated, Philadelphia, Pa., a corporation of Delaware
Filed Mar. 22, 1965, Ser. No. 441,419
Int. Cl. H01m 27/00
U.S. Cl. 136—86    4 Claims

ABSTRACT OF THE DISCLOSURE

The fuel cell having a fuel electrode and a porous oxygen electrode immersed in a static electrolyte solution containing a fuel which reacts at the fuel electrode to form a reaction product which is further reacted in the electrolyte to form a product having a density greater than the electrolyte. The electrodes are spaced a substantial distance from the bottom of a fuel cell container, whereby the reaction product diffuses to the bottom of the fuel container and a fuel-rich electrolyte is maintained in the vicinity of the electrodes. This fuel cell is operated by periodically terminating the gas supply to the oxygen electrode and simultaneously periodically venting the oxygen electrode in order to maintain the cell voltage.

---

This invention relates to a fuel cell for the direct production of electrical energy from a fluid fuel and an improved method for operating a fuel cell. In particular, the invention relates to a fuel cell which has a static electrolyte system with a fluid fuel dissolved or dispersed in the electrolyte, and a method for operating this type of fuel cell at a useful voltage level for long durations.

In U.S. Patent No. 2,925,454 issued to Eduard Justi and August Winsel on Feb. 16, 1960, patentees disclose a fuel cell for the direct production of electrical energy from a fluid fuel intermixed with the electrolyte solution. The patentees indicate that the electrolyte solution fills the fuel cell container and is forced to flow through the container by a pump. They disclose that their fuel cell suffers a voltage drop at high loads unless the electrolyte solution is agitated such as by pumping the electrolyte through the cell container. The pumping and piping requirements limit the usefulness of the Justi et al. fuel cell, particularly in applications in which space and/or weight requirements cannot accommodate the pumping system required by patentees' fuel cell.

It is an object of this invention to provide a fuel cell for the direct production of electrical energy from a fluid fuel intermixed with an electrolyte solution and having a static electrolyte system.

Another object of the invention is to provide a method for operating a fuel cell having a fluid fuel intermixed with its electrolyte solution which maintains the cell voltage at a useful level for long durations.

A further object of this invention is to provide a combination of a navigational light and a fuel cell power source which requires only slight and infrequent maintenance.

Other objects and advantages of this invention will be apparent to those skilled in the art in view of the description which follows, and particularly in view of the drawings, in which:

FIGURE 1 is a schematic diagram of a fuel cell made in accordance with this invention and a navigational light powered by said fuel cell;

FIGURE 2 is a schematic diagram of an oxygen electrode venting system; and

FIGURE 3 is a graph showing cell voltage vs. time for a fuel cell operated in accordance with this invention and for a fuel cell operated without venting the oxygen electrodes.

It has been discovered that a fuel cell for the direct production of electrical energy from a fluid fuel dissolved or dispersed in the electrolyte can be designed and operated at a useful voltage level for long durations without requiring an elaborate electrolyte pumping system. It his been found that a fuel cell having a static electrolyte and a fuel intermixed with the electrolyte solution can be operated so as to obtain good fuel utilization by placing the fuel and oxygen electrodes near the top of the fuel cell container which contains the electrolyte-fuel solution and providing a substantial distance between the bottom of the electrodes and the bottom of the container. During the operation of an alkaline fuel cell, the fuel dissolved or dispersed in the electrolyte reacts at the fuel electrode to form carbon dioxide which is further reacted in the alkaline electrolyte to form an alkali carbonate which has a density greater than the electrolyte. The alkali carbonate reaction product diffuses toward the bottom of the container and thereby displaces the less dense fuel-rich electrolyte upward toward the electrodes. This maintains a relatively fuel-rich electrolyte in the vicinity of the electrodes where it is needed to provide fuel for reaction at the fuel electrode. This diffusion of the dense reaction product to the bottom of the container and the consequent displacement of the fuel-rich electrolyte stratifies the electrolyte solution as evidenced by an electrolyte density at the bottom of the container greater than the electrolyte density in the vicinity of the electrodes. A fuel cell designed and operated in this manner has achieved excellent fuel utilization. It should be noted that the electrolyte must be maintained in a static condition, for it has been found that agitation of the electrolyte disrupts the stratification and adversely affects fuel cell performance.

During the operation of a fuel cell in accordance with this invention, it was found that the fuel cell voltage decayed quite rapidly and the system powered by the fuel cell ceased to function after operating for only a few hours. It was subsequently discovered that the fuel cell voltage could be substantially restored and maintained at a useable value if the gas supplied to the oxygen electrodes is periodically terminated for a brief interval, and simultaneously, the oxygen electrode is allowed to vent. It is believed that the need for venting the oxygen electrodes is associated either with an accumulation within the electrodes of impurities contained in the gas supplied to the oxygen electrodes or with reaction products. The periodic pressure relief with simultaneous venting not only allows scrubbing of accumulated gas impurities but also purges reaction products by movement of the three phase interface within the electrodes, for the electrolyte will be forced toward the interior of the electrodes when the gas supply is terminated and is forced outward when the gas supply is resumed.

A fuel cell made in accordance with this invention may utilize any of the known active materials and electrode constructions disclosed in the prior art. The oxygen electrode has a hollow interior designed to receive an oxidizing gas such as oxygen, air or a halogen. Since the fuel is dissolved or dispersed in the electrolyte, it is not necessary to have hollow fuel electrodes though they may be used. The fuel electrodes may be in the form of a sheet, rod, cylinder, or the like. The fuel and oxygen electrodes are spaced apart and may be separated by a separator material such as a porous plastic or polymeric netting.

A variety of fluid fuels may be utilized in a fuel cell made and operated in accordance with this invention. For example, a water-soluble liquid fuel, such as methyl or ethyl alcohol, may be intermixed with a potassium hydroxide solution, e.g. 40% KOH. Examples of water-soluble fuels which may be used are alcohols, ketones and ethers which have a low number of carbon atoms. Fuels which are insoluble in the electrolyte, such as hydrocarbons having 10 or more carbon atoms, may also be used by dispersing them in the electrolyte with an emulsifier or so-called neutral soap. In addition, carbohydrates, such as sucrose which is soluble in the electrolyte, may also be used as fuels.

A more detailed description of this invention may be had by referring to the drawings in which FIGURE 1 is a diagram of a fuel cell made in accordance with this invention in combination with a navigational light. In FIGURE 1, a navigational light 10 is shown mounted atop a fuel cell 11 which functions as the power source to light the flash tube beacon 12. The fuel cell container 13 contains an alkaline electrolyte-fuel solution 14 which consists of a 40% by weight potassium hydroxide solution having dissolved therein 16% by volume of methyl alcohol which is the fuel. The fuel cell electrodes 15 are immersed in the electrolyte and positioned so as to provide a substantial distance between the bottom of the electrodes and the fuel cell container bottom 16. The fuel cell electrodes 15, not shown in specific detail, comprise 15 oxygen electrodes having hollow interiors and containing nickel and silver, 16 fuel electrodes in sheet form and containing silver and palladium, and a separator prepared from polyethylene netting (sold under the trademark Vexar) inserted between the electrodes. The oxygen and fuel electrodes spaced by separators are tightly assembled into an electrode-separator assembly.

Placed on top of the fuel cell container is a housing 17 which contains the oxygen electrode venting system controls 18 and a converter which raises the fuel cell voltage from about 0.5 v. up to about 400 v. required to power the flash tube beacon 12. The oxygen electrodes are supplied from an oxygen source 19, which may contain small amounts of impurities, and the oxygen is fed to the electrode through the feed line 20. In addition, a gas line 21 is provided to remove exhaust gases from the oxygen electrodes. It should be noted that the exhaust vent 22 located at the end of the gas line 21 is placed in the electrolyte-fuel solution 14 near the top of the solution so as to avoid agitating the reaction product dispersed in the electrolyte-fuel solution below the electrodes. Floating on top of the electrolyte-fuel solution is a thin layer of mineral oil 23, such as a light, clear mineral oil or a lubricating oil, which may be about ½ inch in depth. This oil layer effectively prevents external carbonation of the alkaline electrolyte and helps to prevent fuel escape in the exhaust gas. In addition, if the exhausted electrolyte-fuel solution is drained from the container to be replenished by fresh electrolyte-fuel solution, the electrodes receive a temporary protective oil coating which inhibits oxidation.

FIGURE 2 is a schematic diagram of an oxygen electrode venting system used in the operation of the fuel cell-navigational light illustrated in FIGURE 1. As previously mentioned, it has been found that a fuel cell made in accordance with this invention suffers a severe voltage decay during its operation. This problem can be easily overcome by periodically terminating the gas supply to the oxygen electrodes for a brief interval, e.g. a few seconds, and simultaneously venting the oxygen electrodes. In order to carry out this oxygen electrode venting process, oxygen controls are required, and the system illustrated in FIGURE 2 has been found to be satisfactory.

The oxidizing gas, such as oxygen, air or a halogen, is fed through a gas feed line 20, and the flow of oxidizing gas can be controlled with a pressure gauge 24 which can be set at the desired value. The gas passes through the gauge and into a 3-way solenoid valve 25. The solenoid valve 25 can be automatically set to either let the oxidizing gas pass to the oxygen electrodes 28, or the gas supply can be terminated in the solenoid valve which opens the exhaust gas line 21 and the gas in the electrodes 28 is thereby vented through the exhaust gas line 21 and vent 22. When the solenoid valve is in position permitting access to the oxygen electrodes, the oxidizing gas may pass through a filter 26 and a liquids trap 27. The filter 26 removes impurities from the oxidizing gas before it passes into the oxygen electrodes, and it also functions by removing impurities from the exhaust gas before it reaches the solenoid valve. The liquids trap 27 is designed to remove liquids from the gasses passing therethrough, and in particular, it removes electrolyte solution which may be entrained in the gas which is vented from the oxygen electrodes.

FIGURE 3 is a graph showing cell voltage vs. time for a fuel cell constructed and operated in accordance with this invention. Curve A represents the performance of a fuel cell constructed in accordance with this invention but operated without periodic venting of the oxygen electrodes. As previously indicated, it was found that the cell voltage was subject to constant decay which became so severe after about 10 hours operation that the navigational light powered by the fuel fell ceased to function. This voltage decay is clearly illustrated by Curve A.

It was subsequently determined that the cell voltage can be restored and maintained at a useable value if the oxidizing gas supply to the electrodes is periodically terminated for a brief interval and the electrodes allowed to vent. At the termination of the gas supply, hydrostatic pressure forces the electrolyte-fuel solution to move toward the interior of the electrodes which "scrubs" reaction products and impurities from the pores of the electrode. Curve B represents the performance of a fuel cell which was operated with periodic termination of the oxygen supply to the electrodes and simultaneous venting of the oxygen electrodes. Only a brief interval is required for the venting, and in this instance a 1 second venting was provided hourly, i.e. once each hour. Curve B shows that in this manner the cell voltage was maintained at a useable value for a long duration, in fact, this particular fuel cell-navigational light system has been operating for more than 6 months without failure and yielding approximately 65,000 amp.-hours with the original fuel supply.

The fuel cell which was operated to provide the data presented in FIGURE 3 comprised 15 oxygen electrodes 7⅜ in. by 2⅜ in. by 0.103 in. and 16 fuel electrodes 8 in. by 2¹³⁄₁₆ in. by 0.0075 in. The catalytic material for the oxygen electrode comprised 94.8 grams of silver and 16 grams of nickel per electrode, and the fuel electrode comprised an expanded silver grid weighing 6.62 grams and a silver-palladium mixture pressed onto the grid with the silver amounting to 3.91 grams and the palladium weighed 0.37 gram. The oxygen and fuel electrodes were alternately placed and separated by a polyethylene netting separator (sold under the trademark "Vexar"), and they were bolted together to form an electrode-separator assembly.

A 50 gallon polyethylene drum was used as the fuel cell container, and it contained about 50 gallons of electrolyte-fuel mixture consisting of 40% KOH solution with 16% of volume of dissolved methyl alcohol. The electrode-separator assembly was positioned near the top of the fuel cell container but completely immersed in the electrolyte as shown in FIGURE 1. A pure oxygen source, containing about 0.4% impurities, was used to feed oxygen to the oxygen electrodes.

The fuel cell was used to power a high voltage xenon flash tube light source which makes an excellent navigational light. Since the flash tube required 400 volts, the fuel cell voltage of about 0.5 volt was raised to 12 volts in a first stage and this was increased to 400 volts in the second stage of a two-stage converter. The flash tube was timed to provide one flash every 4 seconds and the current excursion during the off period varied from 22 to 14.5 amps with an average of 18 amps. The fuel cell had an initial operating voltage of 0.53 volt which has decreased to about 0.50 volt after 6 months of continuous, 24 hour/day operation. Electrolyte density measurements have definitely established that the electrolyte-fuel-reaction product mixture is stratified with the mixture near the bottom of the container having a greater density than the fuel-rich mixture near the top.

The above description has specifically described a fuel cell power source utilizing only a single fuel cell. It should be noted that more than one fuel cell can be used if desired and/or necessary, and in fact, a 12 volt incandescent lamp fed from a high efficiency converter powered by three series-connected fuel cells has been developed and found to operate satisfactorily.

Having completely described this invention, what is claimed is:

1. In a method of operating a fuel cell having a fuel electrode and a porous oxygen electrode immersed in a static electrolyte solution containing a fuel which reacts at the fuel electrode to form a reaction product which is further reacted in said electrolyte to form a product having a density greater than said electrolyte, said fuel electrode and said oxygen electrode being positioned in said electrolyte near the top of a fuel cell container with the bottom of said fuel and oxygen electrodes spaced a substantial distance from the bottom of said container so that said product having a density greater than said electrolyte can diffuse to the bottom of said container and thereby displace the fuel-rich electrolyte upward so as to stratify the electrolyte solution as evidenced by an electrolyte density at the bottom of said container greater than the electrolyte density in the vicinity of the electrodes, the improvement which comprises periodically terminating the gas supply to the oxygen electrode for a brief interval and simultaneously periodically venting said oxygen electrode, whereby hydrostatic pressure forces the electrolyte solution to move to the interior surface of the oxygen electrode and resumption of the gas supply forces the electrolyte outward which removes reaction products and impurities from the pores of the oxygen electrode.

2. A method in accordance with claim 1 in which the electrolyte is an alkaline solution.

3. A method in accordance with claim 2 in which the alkaline electrolyte solution contains an alcohol fuel dissolved therein.

4. A method in accordance with claim 1 in which the oxygen electrode is vented through an exhaust vent placed in the electrolyte solution near the top of the solution so as to avoid agitating the reaction product dispersed in the electrolyte solution near the bottom of the fuel cell.

References Cited

UNITED STATES PATENTS

| | | | |
|---|---|---|---|
| 2,901,523 | 8/1959 | Justi et al. | 136—86 |
| 2,925,454 | 2/1960 | Justi et al. | 136—86 |
| 3,250,646 | 5/1966 | Hipp | 136—86 |
| 3,280,014 | 10/1966 | Kordesch et al. | 136—86 |
| 3,340,094 | 9/1967 | Helmuth | 136—86 |
| 3,134,697 | 5/1964 | Niedrach | 136—86 |
| 3,207,682 | 9/1965 | Oswin et al. | 136—86 |

ALLEN B. CURTIS, Primary Examiner

M. J. ANDREWS, Assistant Examiner